(12) United States Patent
Schneider et al.

(10) Patent No.: US 7,704,644 B2
(45) Date of Patent: Apr. 27, 2010

(54) ZERO-ALIGNMENT METHOD FOR TUNABLE FABRICATION OF THREE-DIMENSIONAL PHOTONIC CRYSTALS BY MULTIPLE-EXPOSURE LASER INTERFERENCE USING DIFFRACTION GRATINGS PATTERNED ON A SINGLE MASK

(75) Inventors: Garrett Schneider, New Castle, DE (US); Eric D. Wetzel, Baltimore, MD (US); Dennis W. Prather, Newark, DE (US)

(73) Assignees: University of Delaware, Newark, DE (US); Army Research Laboratory, Aberdeen Proving Ground, MD (US)

( * ) Notice: Subject to any disclaimer, the term of this patent is extended or adjusted under 35 U.S.C. 154(b) by 494 days.

(21) Appl. No.: 11/307,148

(22) Filed: Jan. 25, 2006

(65) Prior Publication Data
US 2007/0097470 A1 May 3, 2007

Related U.S. Application Data

(60) Provisional application No. 60/646,796, filed on Jan. 25, 2005.

(51) Int. Cl.
*G03H 1/02* (2006.01)
(52) U.S. Cl. .................. 430/1; 430/2; 359/35; 359/3
(58) Field of Classification Search .................. None
See application file for complete search history.

(56) References Cited

U.S. PATENT DOCUMENTS

| | | | | |
|---|---|---|---|---|
| 3,689,149 | A | * | 9/1972 | Livingood .................... 355/46 |
| 6,606,432 | B2 | * | 8/2003 | Gaylord et al. ................ 385/37 |
| 6,800,421 | B2 | * | 10/2004 | Hasegawa et al. ............ 430/311 |
| 6,875,544 | B1 | * | 4/2005 | Sweatt et al. .................. 430/5 |
| 2003/0129501 | A1 | * | 7/2003 | Megens et al. ................. 430/1 |

OTHER PUBLICATIONS

Chelnokov et al., "An optical drill for the fabrication of photonic crystals" J. Opt. A:Pure Appl. Opt., vol. 1 p. L3-L6 (1999).*
Berger et al. "Photonic band gaps and holography", J. Appl. Phys. vol. 82(1) pp. 60-64 (Jul. 1997).*

(Continued)

*Primary Examiner*—Martin J Angebranndt
(74) *Attorney, Agent, or Firm*—RatnerPrestia (57) ABSTRACT

A method for fabricating three-dimensional photonic crystal structures includes providing a layer of photosensitive material; introducing a laser beams into the material; reintroducing the laser beams into the photosensitive material during a second exposure; combining results from at least the first and second exposures to produce a three-dimensionally periodic pattern in the photosensitive material. A related system includes a laser source; a grating array having a plurality of diffraction gratings located thereon; a mask plate located on a photoresist layer and arranged in registration with the grating array; a rotating shutter arranged between the grating array and the laser source, said rotating shutter being suitable for periodically blocking light from the laser source; wherein each of the diffraction gratings is positioned and oriented so as to converge all first-order diffracted spots to a common point lying in a plane of a back side of the mask plate.

14 Claims, 9 Drawing Sheets

OTHER PUBLICATIONS

Escuti, "Tailoring morphology in holographic polymer dispersed . . . ", SID'02 Digest pp. 550-553 (2002).*

Murakowski, J. et al., "Fabrication of 3-Dimensional Photonic Crystals with Embedded Defects," *Proc. SPIE*, 5347 p. 181, 2004.

Yablonovitch, E., "Inhibited Spontaneous Emission in Solid-State Physics and Electronics," *Physical Review Letters*, 58:20, pp. 2059-2062, May 18, 1987.

Yablonovitch, E. et al., "Photonic Band Structure: The Face-Centered-Cubic Case Employing Nonspherical Atoms," *Physical Review Letters*, 67:17, pp. 2295-2298, Oct. 21, 1991.

Özbay, E. et al., "Measurement of a Three-Dimensional Photonic Band Gap in a Crystal Structure Made of Dielectric Rods," *Physical Review B*, 50:3, pp. 1945-1948, Jul. 15, 1994-I.

Ho, K. M. et al., "Photonic Band Gaps in Three Dimensions: New Layer-By-Layer Periodic Structures," *Solid State Communications*, 89:5, pp. 413-416, 1994.

Cheng, C. C. et al., "Fabrication of Photonic Band-Gap Crystals," *J. Vac. Sci. Technol. B*, 13:6, pp. 2696-2700, Nov./Dec. 1995.

Feiertag, G. et al., "Fabrication of Photonic Crystals by Deep X-Ray Lithography," *Appl. Phys. Lett.*, 71:11, pp. 1441-1443, Sep. 15, 1997.

Lin, S. Y. et al., "A Three-Dimensional Photonic Crystal Operating at Infrared Wavelengths," *Nature*, vol. 394, pp. 251-253, Jul. 16, 1998.

Cumpston, B. H. et al., "Two-Photon Polymerization Initiators for Three-Dimensional Optical Data Storage and Microfabrication," *Nature*, vol. 398, pp. 51-54, Mar. 4, 1999.

Shoji, S. et al., "Photofabrication of Three-Dimensional Photonic Crystals by Multibeam Laser Interference into a Photopolymerizable Resin," *Applied Physics Letters*, 76:19, pp. 2668-2670, May 8, 2000.

Noda, S. et al., "Full Three-Dimensional Photonic Bandgap Crystals at Near-Infrared Wavelengths," *Science*, vol. 289. pp. 604-606, Jul. 28, 2000.

Johnson, S. G. et al., "Three-Dimensionally Periodic Dielectric Layered Structure with Omnidirectional Photonic Band Gap," *Applied Physics Letters*, 77:22, pp. 3490-3492, Nov. 27, 2000.

Vlasov, Y. A. et al., "On-Chip Natural Assembly of Silicon Photonic Bandgap Crystals," *Nature*, vol. 414, pp. 289-293, Nov. 15, 2001.

Divliansky, I. et al., "Fabrication of Three-Dimensional Polymer Photonic Crystal Structures Using Single Diffraction Element Interference Lithography," *Applied Physics Letters*, 82:11, pp. 1667-1669, Mar. 17, 2003.

Shoji, S. et al., "Photofabrication of Wood-Pile Three-Dimensional Photonic Crystals Using Four-Beam Laser Interference," *Applied Physics Letters*, 83:4, pp. 608-610, Jul. 28, 2003.

Schneider, G. J. et al., "Combination Lithography for Photonic-Crystal Circuits," *J. Vac. Sci. Technol. B*, 22:1, pp. 146-151, Jan./Feb. 2004.

Liu, Y. et al., "Fabrication of Three-Dimensional Photonic Crystals with Two-Beam Holographic Lithography," *Applied Optics*, 45:3, pp. 480-483, Jan. 20, 2006.

Cai, L. Z. et al., "All Fourteen Bravais Lattices can be Formed by Interference of Four Noncoplanar Beams," *Optics Letters*, 27:11, pp. 900-902, Jun. 1, 2002.

Campbell, M. et al., "Fabrication of Photonic Crystals for the Visible Spectrum by Holographic Lithography," *Nature*, 404, pp. 53-56, Mar. 2, 2000.

* cited by examiner

ZERO-ALIGNMENT METHOD FOR TUNABLE FABRICATION OF THREE-DIMENSIONAL PHOTONIC CRYSTALS BY MULTIPLE-EXPOSURE LASER INTERFERENCE USING DIFFRACTION GRATINGS PATTERNED ON A SINGLE MASK

CROSS REFERENCE TO RELATED APPLICATIONS

This Application claims the benefit under 35 U.S.C. §119 (e) of U.S. Provisional Application 60/646,796 filed on Jan. 25, 2005, the entire contents of which are incorporated herein by reference.

STATEMENT REGARDING FEDERALLY FUNDED RESEARCH

The United States Government, through the Army Research Laboratory, may have certain rights in this application as provided for in contract number DAAD 19-01-2-0005.

BACKGROUND

Photonic crystals (PhCs), the optical analogues of electronic semiconductors, have been the subject of intense international research efforts for well over a decade. A photonic crystal consists of an ordered dielectric structure having a spatially periodic dielectric constant with a lattice constant comparable to, or less than, the wavelength of the electromagnetic wave. A photonic crystal with a complete band gap can be used to localize electromagnetic waves, inhibit spontaneous emission, and to guide the propagation of electromagnetic waves along certain directions. Due to the performance enhancement they provide in terms of emission control, guiding, and dispersion engineering, PhCs are expected to become the elementary building blocks of next-generation opto-electronic devices.

A complete band gap in the microwave regime has previously been demonstrated. However, the fabrication of 3D photonic crystals for other regions of the electromagnetic spectrum continues to be a challenging problem. Currently, some of the more popular fabrication methods pursued actively in the research community fall generally into three categories: layer-by-layer; fabrication; interferometric and multi-photon volumetric lithography, and self-assembly techniques.

Each of these categories possesses unique advantages and disadvantages. Most layer-by-layer methods realize PhCs directly in high-index dielectrics and semiconductors, but require tedious repetitive alignment, patterning, etching and deposition cycles. Self-assembly methods can quickly realize large-volume 3D PhCs, but they tend to contain many unintended defects and must be back-filled with high-index material to obtain a complete gap. Multi-photon absorption patterning can produce quality PhCs with designed defects, but they are serial in nature and thus poorly suited to batch fabrication, and like self-assembly they yield low index-contrast PhCs.

What is needed is a lithographic approach for producing PhCs that is compatible with existing semiconductor microelectronics fabrication techniques, e.g., lithographic techniques.

SUMMARY

This disclosure is directed to the interference lithography, or holographic, approach for creating PhCs. This disclosure is particularly directed to a new process for the fabrication of three-dimensional photonic crystals, and is based on the combination of several laser beams within a layer of photosensitive material (such as photoresist). Several beams are introduced into the material, generating an interference pattern that is recorded in the material as a latent image. This process may be repeated for several such exposures, in a way such that the combined result of all exposures is a three-dimensionally periodic pattern that can be revealed by chemical development. One novel aspect of the disclosure lies in the method used to generate the interfering laser beams from a single parent beam. A single mask plate patterned with several sets of diffraction gratings is used, and each set of gratings may be separately illuminated to prevent the recording of undesired spatial frequencies arising from interference between different sets. The sets may be isolated by a movable beam blocker.

This disclosure provides a method for fabricating three-dimensional photonic crystal structures by interference lithography, capable of generating face-centered cubic ("fcc") lattices with lattice periods that can be controllably varied over a wide range. In one embodiment, the method comprises three separate exposures of a layer of photoresist by interfering laser beams, where each exposure generates a two-dimensional interference pattern, specifically a tilted set of parallel rods. When properly oriented, superimposing these three rod arrays within a common volume of resist material yields an fcc lattice. The lattice period is controlled by the spacing of the rod arrays, which can be tuned independently of the laser wavelength by varying the relative orientations of the interfering beams. We have developed a method for generating the necessary laser beams that is highly repeatable and requires zero alignment, using an array of diffraction gratings patterned on a single mask plate and a rotating beam blocker to select which subset of the grating array is to be used for any given exposure. This disclosure describes the method and fabrication setup, and presents various samples that have been fabricated using this method.

In another embodiment, a system for fabricating three-dimensional photonic crystals includes a laser source; a grating array having a plurality of diffraction gratings located thereon; a mask plate located on a photoresist layer and arranged in registration with the grating array; a rotating shutter arranged between the grating array and the laser source, said rotating shutter being suitable for periodically blocking light from the laser source; wherein each of the diffraction gratings is positioned and oriented so as to converge all first-order diffracted spots to a common point lying in a plane of a back side of the mask plate.

BRIEF DESCRIPTION OF THE DRAWINGS

FIG. 2(a) depicts a zero-alignment setup using monolithic grating array plus rotating shutter/beam blocker; FIG. 2(b) shows an exemplary layout of gratings and rotating blocker; squares indicate grating location, lines indicate the direction along which the first-order diffracted beam will travel (projected onto the plane of the mask) until they intersect in the target area of the photoresist at the center; FIG. 2(c) provides a 3D depiction of the diffracted beam geometry; solid lines indicate k-vectors, dotted lines indicate polarization vectors, assuming that the beam illuminating the mask is polarized horizontally with respect to the grating arrangement as shown in FIG. 2(b).

FIG. 6(a) shows calculated (top) and fabricated (bottom) PhCs made using the 6° mask, with an fcc lattice constant of 2.2 μm.

FIG. 6(b) shows calculated (top) and fabricated (bottom) PhCs made using the 4° mask, with an fcc lattice constant of 3.1 μm. Note that both SEM images have the same scale.

FIG. 8(a) contains an image of a grating array used in a single-exposure experiment (the center "grating" is a window) at left, and at right an SEM image of a resulting PhC sample.

FIG. 8(b) contains a cross-sectional SEM image of a sample fabricated using the multiple exposure Yablonovite method. The inset in FIG. 8(b) is a similar cross-sectional image from a single-exposure sample, matched to scale to illustrate the vast difference in the length scales of the features patterned.

DETAILED DESCRIPTION

Interference lithography, or holographic lithography, has tremendous potential for the rapid fabrication of large volume, defect-free, three-dimensional (3D) photonic crystals (PhCs). By exposing a volume of photosensitive material using several coherent laser beams, a 3D lattice can be patterned, replicating the interference pattern formed by the beams. The 3D lattice is determined by the orientations of the incident beams. It has been proven that all 14 Bravais lattices can be realized by the use of only four beams.

In general, the total irradiance from the combination of N beams can be expressed as $$\psi(r) = \left| \sum_{m=1}^{N} \varphi(k_m) e^{ik_m \cdot r} \right|^2, \quad (1)$$

which can be expanded into $$\psi(r) = \frac{1}{2} = \sum_{m=1}^{N} \sum_{n=1}^{N} \hat{e}_m \cdot \hat{e}_n |\varphi_m||\varphi_n| \cos\{(k_m - k_n) \cdot r + \Delta\phi_{mn}\}, \quad (2)$$

where $\phi(k_m) = |\phi_m| e^{i\phi_m}$ is the complex amplitude of the mth beam, $\hat{e}_m$ is its polarization, and $\Delta\phi_{mn}$ is the relative phase between the mth and nth plane waves. Thus, the spatial frequencies of the lattice defined by the interference pattern, and hence the reciprocal lattice vectors (RLVs) of the lattice, are given by the differences between the wavevectors of the interfering beams, $\Delta k_{mn} = k_m - k_n$. Therefore, in order to define any lattice we desire, we need only to arrange a set of beams such that the k-differences define the reciprocal lattice corresponding to the desired lattice.

There are two primary shortcomings of the interference lithography method. First, because of the large scale, parallel nature of the method, additional processing is required to incorporate engineered defects such as waveguide channels and cavities; we have proposed a combination e-beam/UV-interference method to address this need. Second, because it is based on photopolymers, the resulting air-polymer structures have low dielectric contrast, therefore again, further processing (e.g. backfilling) is required to realize the potential of a complete band gap.

Further difficulties arise in the interference method because of the need to arrange the beams and their polarizations in such a way as to optimize the overall contrast in the pattern, ensuring that all the desired Δk's, i.e. the ones that comprise the RLVs of the desired pattern, have large and roughly equal contributions to the sum in Eq. 2, while the contributions of other Δk's are minimized. In addition, when interfering all N beams simultaneously, there are constraints on the relationship between the PhC lattice constant and the wavelength of the exposing laser. Specifically, the size of the lattice cannot be tuned without also distorting its symmetry, because in general only a few specific beam configurations contain a set of Δk's that comprise the RLVs of a lattice that is favorable for a photonic band gap, such as a face-centered cubic ("fcc") or body-centered cubic ("bcc").

However, it is known that exposures using more than four beams, distributed over multiple exposures, are also capable of realizing 3D PhCs, often more conveniently than with a single exposure. A significant advantage of using multiple exposures, each producing a 1D or 2D interference pattern (array of planes or rods), is that the lattice period can be varied without deforming the lattice symmetry. As a result, UV or visible lasers can be used to expose 3D PhCs with lattice constants of several micrometers. A drawback to this approach comes from its sensitivity to the relative phases of the interference patterns formed during the several exposures, a symptom of the need to align the patterns from each of the multiple exposures.

For example, a phase shift of π in one beam, as caused by a λ/2 displacement of a beam-steering mirror, will displace the antinodes of the interference pattern by one-half the lattice period, compromising the alignment of the several exposures. Alignment and stability problems also arise if the sample substrate/container must be repositioned or reoriented between exposures.

In this disclosure, a fabrication approach is presented that is immune to the problems described above. Using multiple 3-beam exposures and a monolithic diffraction mask to generate all beams, we have developed an interference analogue of the drilling strategy originally described in the literature. Each 3-beam exposure is generated by a set of three diffraction gratings, oriented to produce an interference pattern consisting of a hexagonal array of rods, oriented 35.26° from the normal to the gratings. Three such grating triplets are positioned on the same grating mask, each triplet positioned at 120° azimuthal intervals, and they are illuminated with a parent laser beam, one at a time. A rotating shutter blocks two of the triplets for each exposure. The sum of the exposure doses, each generating a set of rods, yields an fcc PhC lattice. The lattice period is determined by the period of the rod arrays, which can be adjusted by changing the spacing of the gratings in each triplet. Because all the beams are generated by gratings on a single, monolithic mask plate, there is no possibility for phase drift to compromise the pattern as described earlier. There is also zero alignment required, as the substrate is placed in direct contact with the back side of the mask plate.

Figure 1:
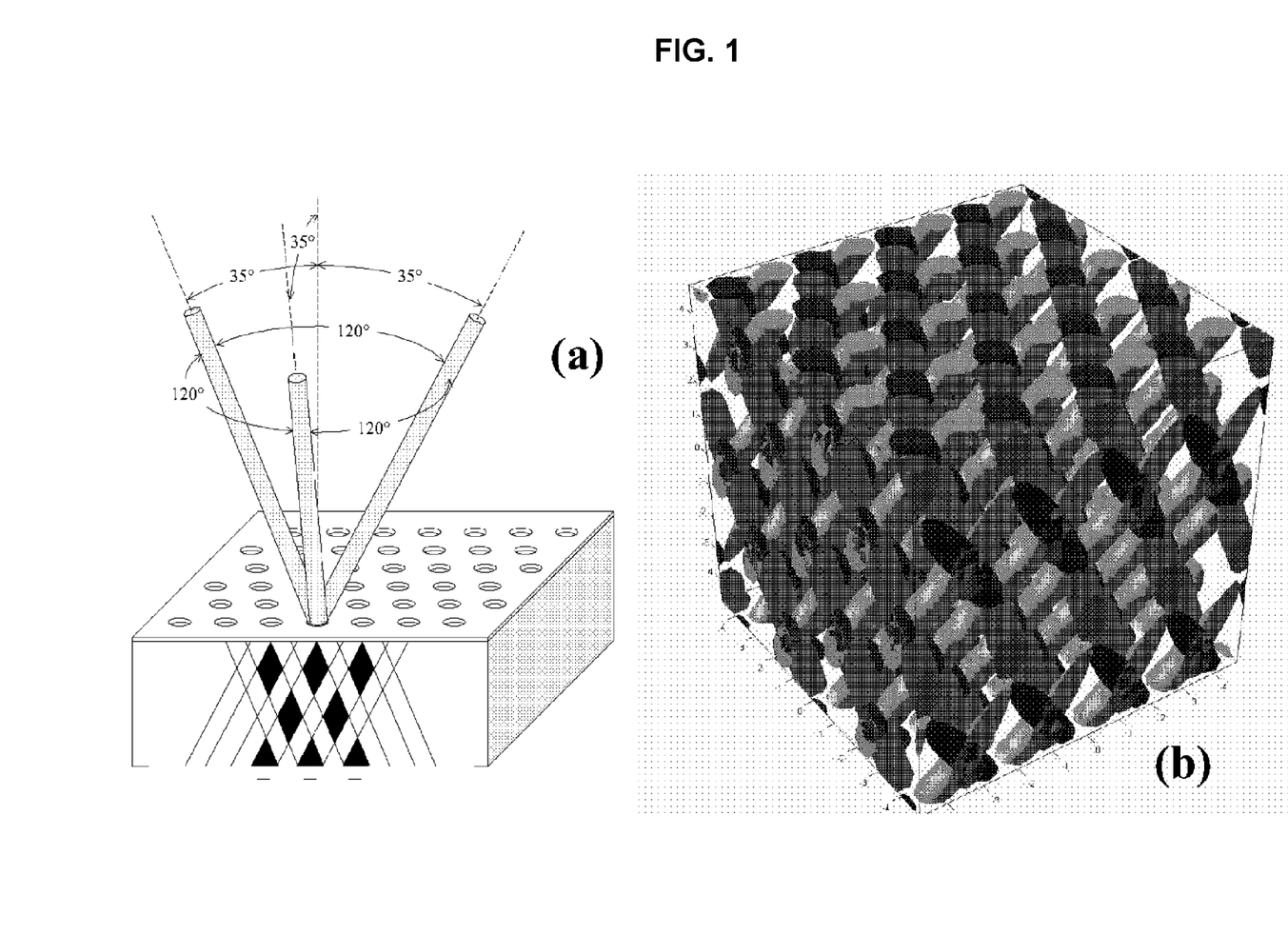
FIG. 1(a) is a schematic representation of a fabrication approach for PhCs, generally termed the "Yablonovite" strategy.
FIG. 1(b) is the computed inverse of the structure in 1(a).

The conventional photonic crystal fabrication strategy proposed by Yablonovitch, et al. in 1991 is depicted schematically in FIG. 1(a). Each of the three cylinders represents the path of a bit that was used to mechanically drill three sets of parallel holes into a block of dielectric material. On the top of the block, a template mask is used to align the arrays of holes. The cylinders' orientations as indicated yield an fcc lattice with diamond-like symmetry, one that possesses a complete photonic band gap for sufficient dielectric contrast, which some have termed "Yablonovite."

This general fabrication strategy has been extended and generalized in several ways with the goal of scaling the structure down from the microwave regime. For example, a PhC has been created by replacing the mechanical drilling with an x-ray beam, while another conventional approach used anisotropic angled ion etching.

Another structure that has been widely adopted by researchers attempting to fabricate 3D PhCs is the so-called "woodpile," popular owing to its being particularly well-suited to layer-by-layer fabrication, as well as its possession of a complete band gap. It has been demonstrated that two exposures, each generating a square lattice of rods aligned in mutually perpendicular directions, could recreate the woodpile structure. This work also demonstrated that interference methods could be used to create 3D structures with lattice constants not constrained by the exposing wavelength. However, their approach required the sample to be repositioned, and then rotated 90 degree between the two exposures. This requirement is likely to cause alignment problems and compromise repeatability, as described previously.

The method of this disclosure combines the multiple-exposure concept with the Yablonovite strategy, and does so using a highly advantageous, zero-alignment experimental setup described below.

Figure 2:
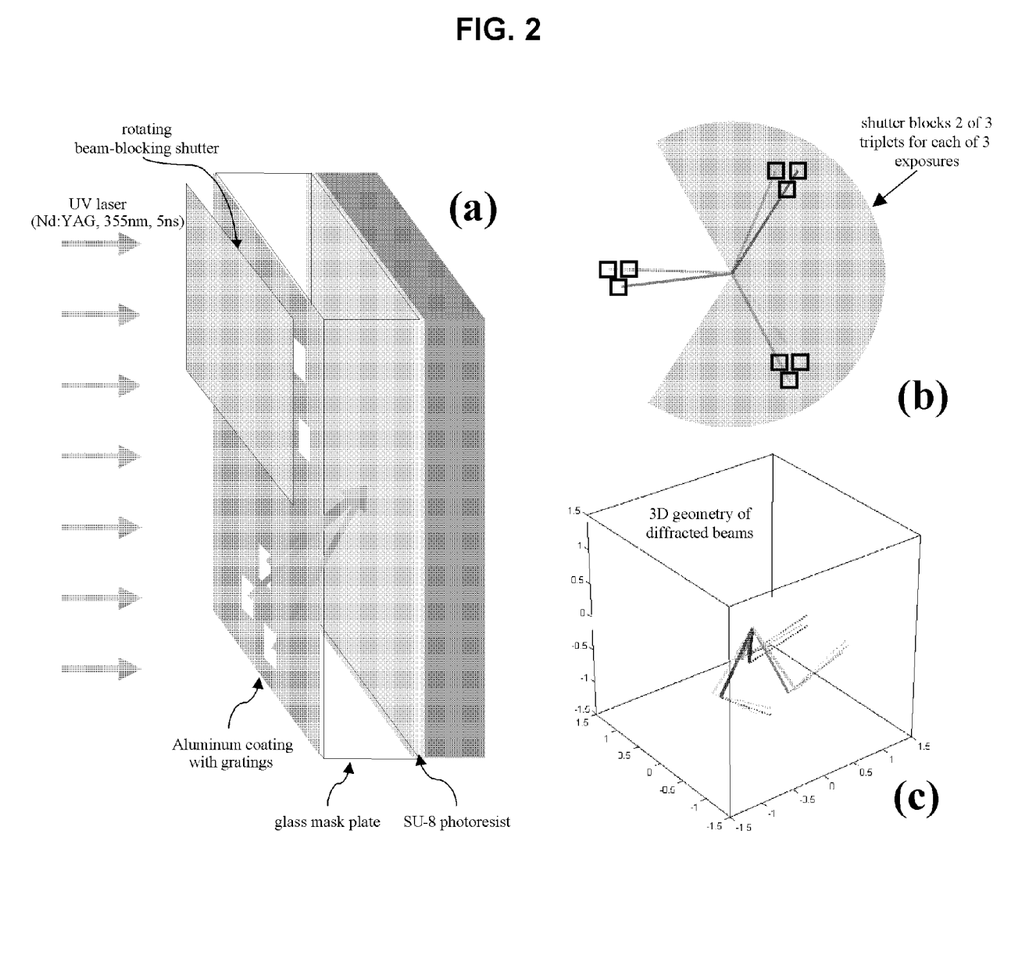
FIG. 2 illustrates an experimental setup for realizing PhCs by interferometric Yablonovite strategy.

By using three exposures to generate rod arrays analogous to the drilled cylinders, we can recreate Yablonovite interferometrically, as indicated by FIG. 1(b). In addition, we can generate all nine necessary beams (3 exposures, each using 3 beams) from a single diffraction grating mask, eliminating the need to reposition the sample. The experimental setup for realizing approach is shown in FIG. 2.

The diffraction grating mask is computer-designed and patterned by e-beam lithography. Each of the nine gratings is positioned and oriented such that all first-order diffracted spots converge to a common point, which has been calculated to lie in the plane of the back side of the mask plate. Hence, the setup is "zero-alignment," because the photoresist layer to be patterned can be properly positioned for exposure by simply placing it in flush contact with the back side of the mask. Subsequently there is no relative movement between the sources of the beams (the gratings) and the sample. Only a rotating beam blocker/shutter is moved between exposures, isolating one triplet of gratings for each exposure. Therefore this arrangement is simple to use and will produce very repeatable results.

Figure 3:
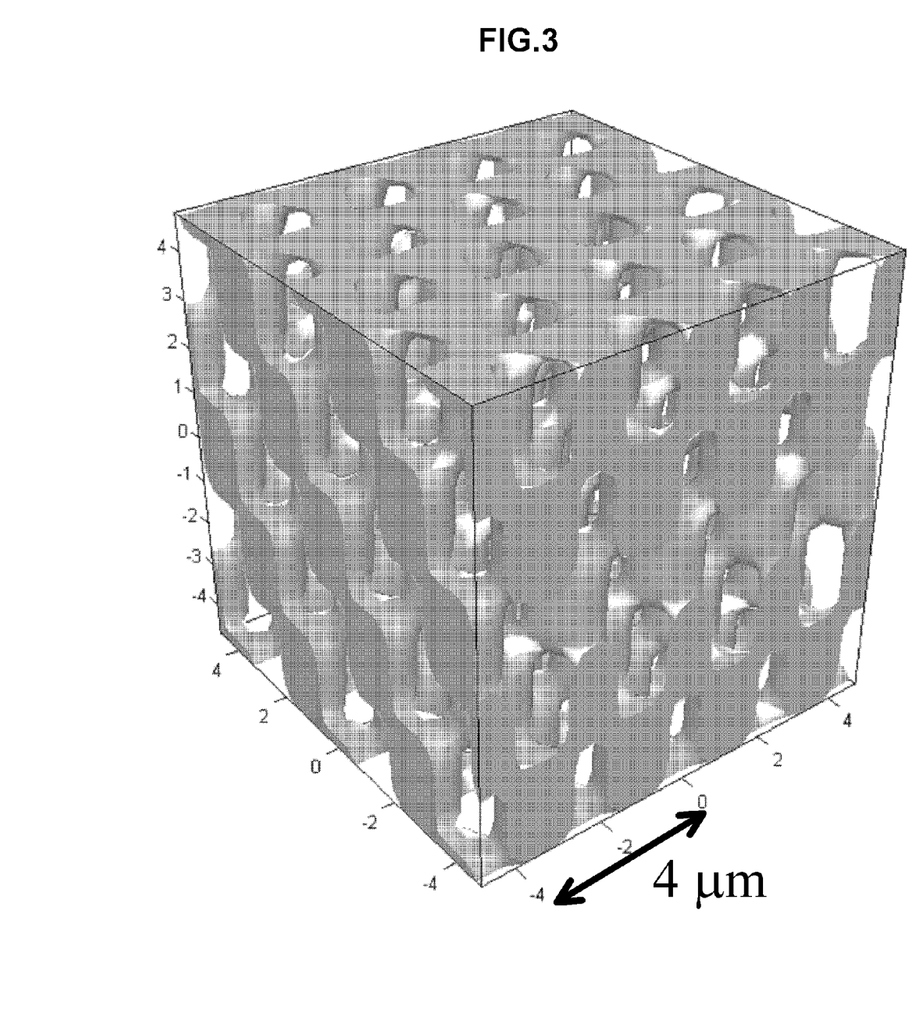
FIG. 3 illustrates a calculated surface of constant dose resulting from al three exposures of the interferometric Yablonovite strategy. The resulting lattice has diamond-like fcc symmetry that is favorable for a complete photonic band gap.

FIG. 3 depicts the calculated appearance of a PhC fabricated by the proposed method. The figure contains a calculated surface of constant dose for the three rod-array exposures. The structure differs from the appearance of FIG. 1(b) because the surfaces of the rods shown in FIG. 1(b) are surfaces of constant intensity for the individual exposures, created by choosing a threshold intensity from within the volume of the interference pattern; in reality the dose associated with each rod array varies smoothly between the antinodes and the adjacent nodes. Therefore, when all three exposures are combined, the result is that the regions around the rod intersections are enlarged compared to the rods depicted in FIG. 1(b). Nevertheless, the structure possesses diamond-like fcc symmetry just as the original Yablonovite does.

In order to demonstrate the flexibility of our approach, specifically its ability to readily vary the length scale of fabricated PhC samples, we fabricated two sample diffraction mask plates. By varying the relative spacing of the gratings, we are able to control the relative angles of the three beams comprising each exposure; yet by preserving the same central axis in each exposure (inclined 35.26° from the vertical), we maintain the desired fcc symmetry.

Figure 4:
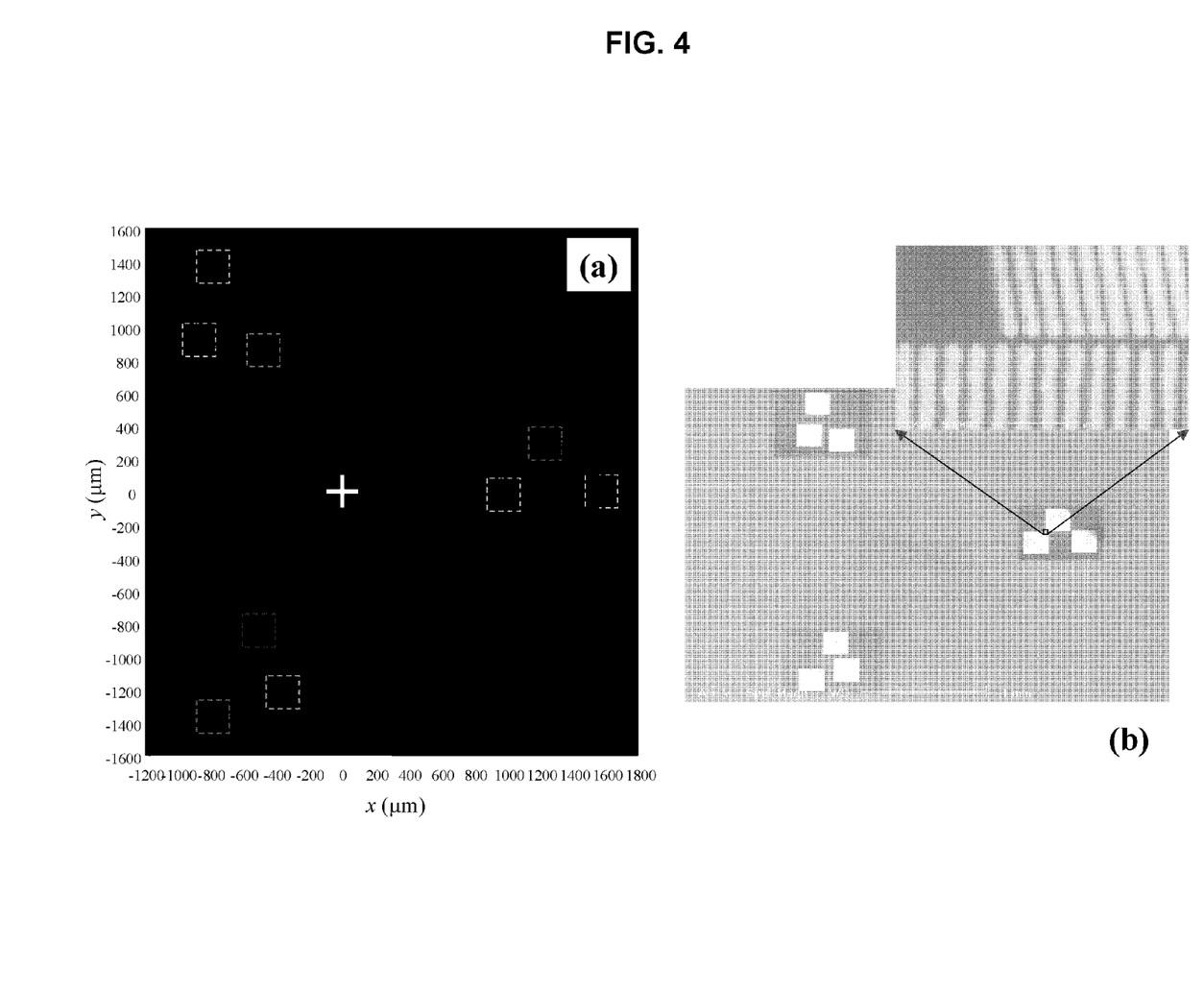
FIG. 4(a) illustrates fabricated grating layouts wherein the solid squares yield a 4° relative separation between the beams within a single exposure and the dashed squares yield a 6° separation, resulting in a smaller lattice constant. All separation angles, for both sets, are relative to a central axis inclined 35.26° from normal to the sample surface, according to the Yablonovite strategy.
FIG. 4(b) illustrates a grating array fabricated in Aluminum (Al), following the layout of the solid squares in FIG. 4(a). Grating periods vary between ~300-400 nm, as seen in the inset, with each grating's period designed so that diffracted beams intersect at the center of the pattern, i.e., the origin of coordinates in (a).

FIG. 4(a) depicts the layout of the gratings for the two exemplary masks, superimposed to emphasize the relationships among grating positions described above. The squares with solid perimeters correspond to gratings that will diffract beams that are separated from their central axis by 4°. For those squares with dashed perimeters, the separation angle is 6°. FIG. 4(b) contains an SEM micrograph of the fabricated 4° grating array.

The gratings were fabricated by electron-beam lithography using a Raith 50 lithography tool. Gratings were patterned in PMMA, which was developed and served as a mask for dry etching of the aluminum mask plate. The 100-nm layer of Al was etched in an inductively coupled plasma (ICP) etching machine (SAMCO RIE-200iP) using a mixture of Cl2 and BCl3 gases.

An exemplary exposure source is a Q-switched, frequency-tripled Nd:YAG laser, generating 10-ns pulses of 355-nm ultraviolet radiation, with pulse energies of 10-30 mJ. The beam blocker was simply a plain Al mask plate, positioned on a rotation stage whose axis was aligned to the center of the grating pattern, and which was used to block two of the three grating triplets for each exposure. The resist material we used was SU-8 (Microchem, Inc.), chosen for its ability to form quality thick films and transparency at the exposing wavelength.

Figure 5:
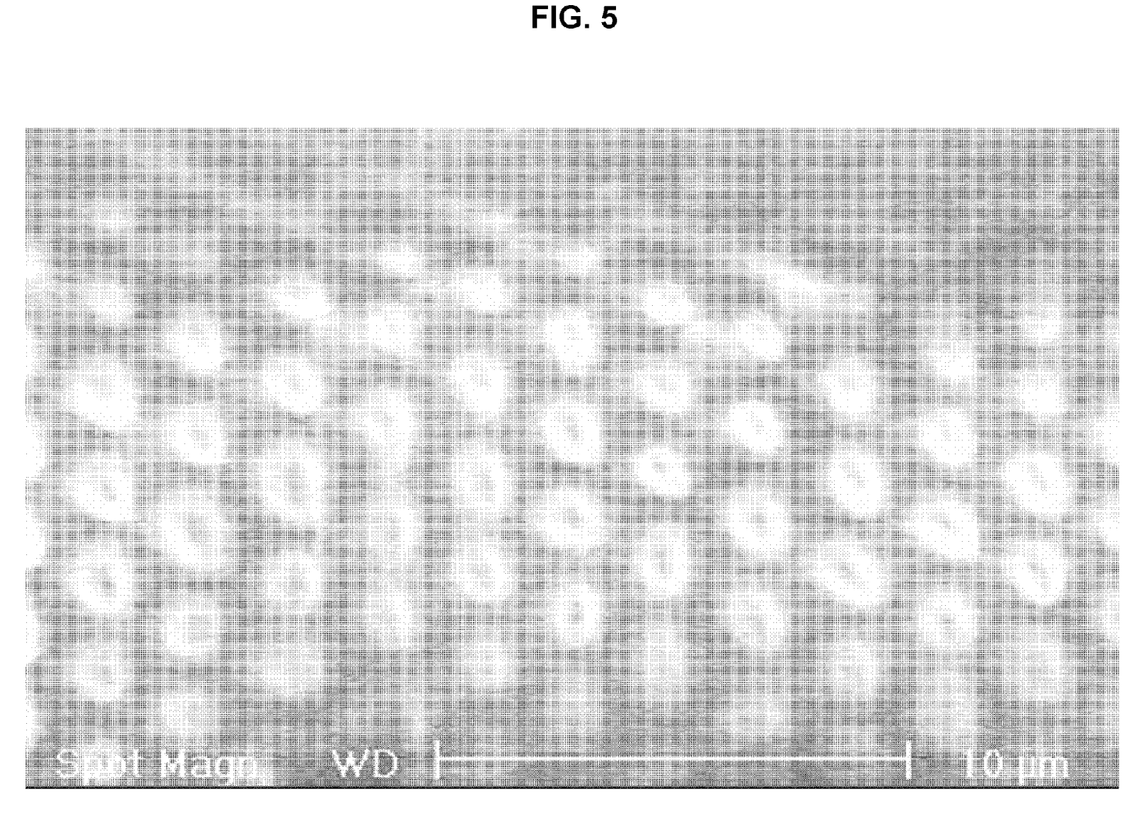
FIG. 5 provides a scanning electron beam microscope (SEM) micrograph of a PhC sample fabricated by this method. The in-plane periodicity shown is ~2 μm, corresponding to an fcc lattice constant of 3.1 μm.

FIG. 5 is an SEM micrograph showing a top-down view of a PhC fabricated using the 4°-separation-angle mask shown in FIG. 4(b). Examining the top plane, which corresponds to a (111) plane of the fcc lattice, we can estimate the fcc lattice constant to be 3.1 µm. This would correspond to a photonic band gap in the mid-IR region of the spectrum, yet this sample was patterned interferometrically with a UV laser.

Figure 6:
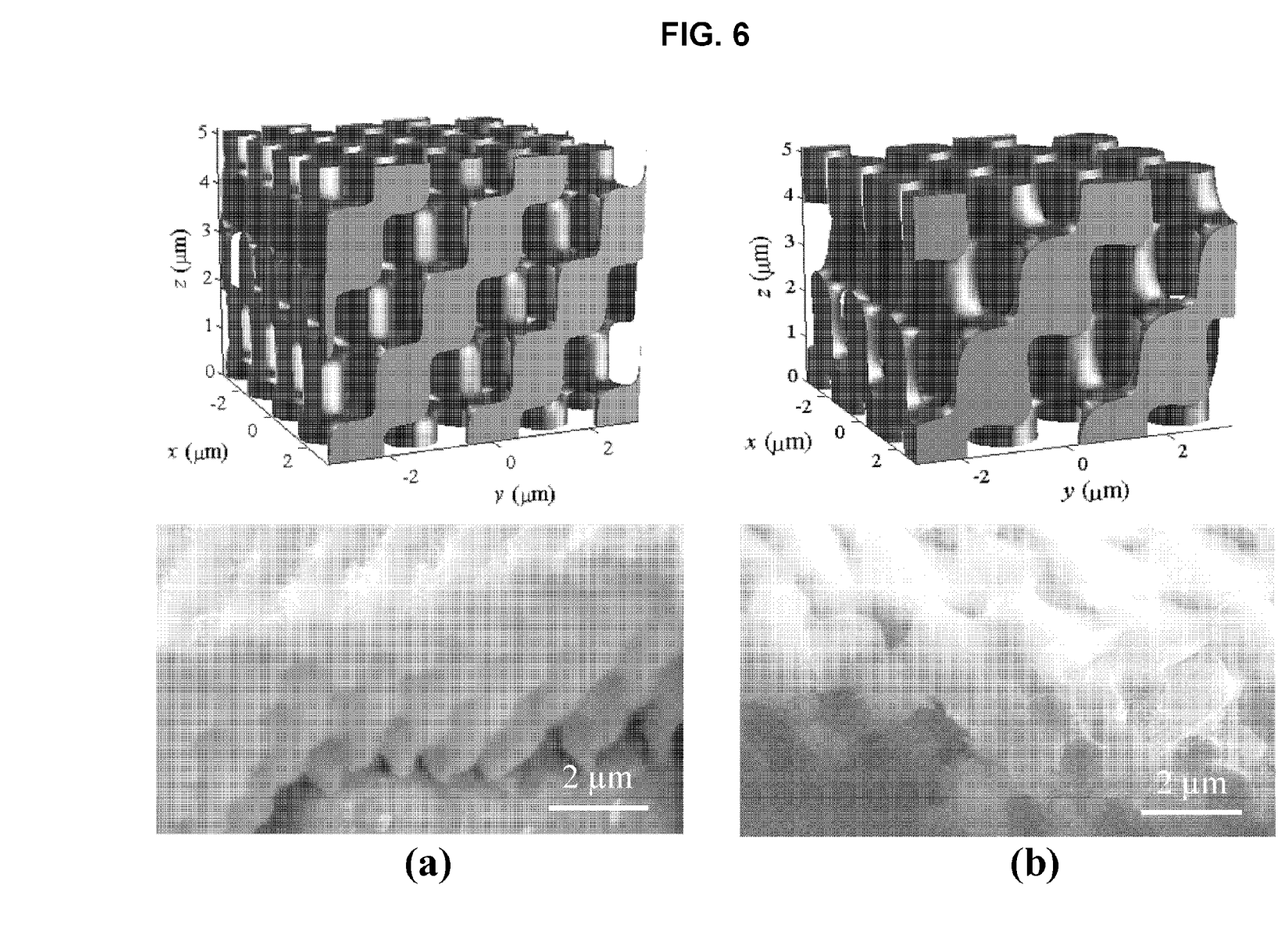
FIG. 6 provides a comparison of samples fabricated using diffraction grating arrays with different spacings, as depicted in FIG. 4(a).
Figure 7:
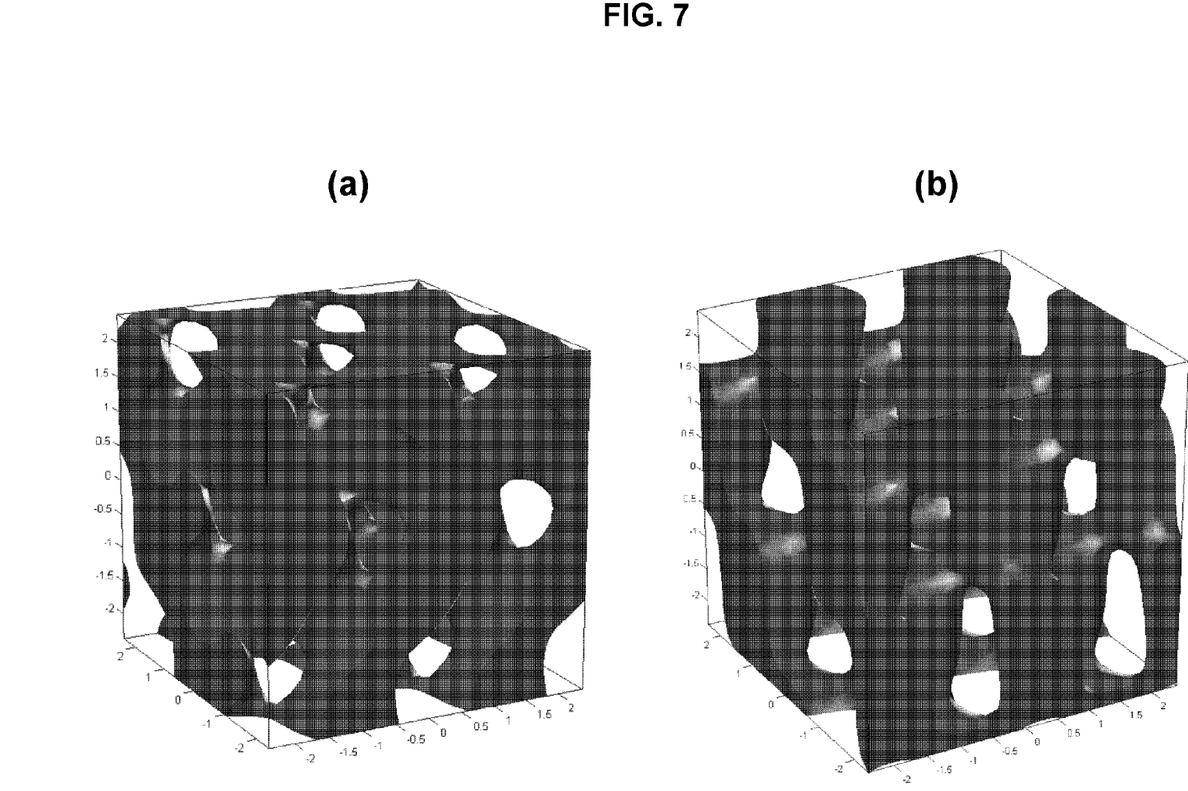
FIGS. 7(a)-7(d) illustrate the calculated effect of randomizing the phases of the laser beams used to generate the interference pattern. Note that all the structures shown possess the same face-centered cubic (fcc) symmetry, and nearly the same filling fraction, although the shape of the contents of the unit cell varies considerably.

FIG. 6 contains a side-by-side comparison of PhC samples fabricated using both (a) the 6° and (b) the 4° mask. The top images are calculated structures, and the bottom graphs are cross-sectional SEM images. Note the difference in the lattice periods (the two SEMs are scaled the same), demonstrating the ability to control the lattice constant while preserving the lattice symmetry and using a single, UV laser source. The lattice parameter in FIG. 6(a) is 2.2 µm, while in FIG. 6(b) it is 3.1 µm.

As an example, FIGS. 7(a)-7(d) illustrate calculated effects of randomizing the phases of the laser beams used to generate the interference pattern. Note that all the structures shown in these figures possess the same face-centered cubic symmetry, and nearly the same filling fraction, although the shape of the contents of the unit cell varies considerably.

Figure 8:
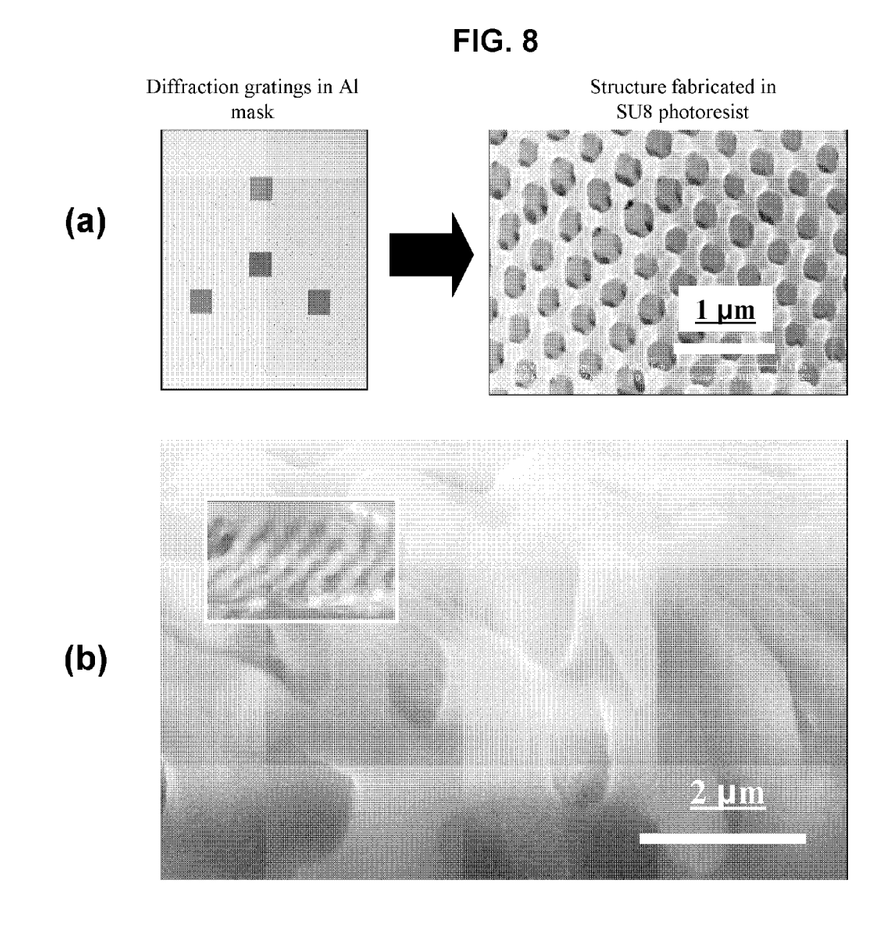
FIG. 8 provides a comparison of samples fabricated using (a) single-exposure interference lithography and (b) multiple-exposure.

When considering the variability of the lattice constants that can be realized using the method we have developed, it is useful to compare the samples obtained by multiple-exposure methods to those fabricated by single-exposure methods. FIG. 8 is a comparison of fcc PhCs obtained by both single (FIG. 8(a)) and multiple (FIG. 8(b)) exposure methods. Clearly, multiple exposure methods allow interference lithography to be scaled up to mid-IR length scales without scaling the laser wavelength, allowing it to be applied to a much wider range of the spectrum.

The disclosed PhC fabrication method possesses many unique advantages. By combining multiple exposures with a zero-alignment system and monolithic grating arrays, we have realized a PhC fabrication approach that is easily scaled throughout the mid-IR regime, that is simple and repeatable, and that yields a diamond-like structure favorable for complete photonic band gaps. We have demonstrated the feasibility of the method, and its capability to make PhCs with controllable lattice constants. The method makes it simple to use interference lithography for PhCs operating in regions of the spectrum that previously were limited to other fabrication approaches.

The above examples are not intended to limit the disclosure, as those skilled in the art would be able to make and use various undisclosed alternative embodiments in light of our disclosure above, and which would fall within the scope of the following claims.

What is claimed as new and desired to be protected by Letters Patent of the United States is:

1. A process for fabricating a three-dimensional photonic crystal, the process comprising:
   providing a grating array having first, second and third sets of diffraction gratings wherein said grating array is secured on a mask plate which separates the grating array from a layer of photosensitive material;
   introducing a first plurality of laser beams into the photosensitive material through a first set of said diffraction gratings during a first exposure wherein the first plurality of laser beams comprises providing a singular beam directed at the first set of diffraction gratings while blocking the second and third sets of diffraction gratings with a beam-blocking shutter;
   moving the beam-blocking shutter to expose the second set of diffraction gratings and cover the first and third sets of diffraction gratings;
   introducing a second plurality of laser beams into the photosensitive material through the second set of diffraction gratings during a second exposure different from the first exposure wherein the second plurality of laser beams comprises providing a singular beam directed at the second set of diffraction gratings while blocking the first and third sets of diffraction gratings with the beam-blocking shutter;
   moving the beam-blocking shutter to expose the third set of diffraction gratings and cover the first and second sets of diffraction gratings;
   introducing a third plurality of laser beams into the photosensitive material through the third set of said diffraction gratings during a third exposure different from the first and second exposures wherein the third plurality of laser beams comprises providing a singular beam directed at the third set of diffraction gratings while blocking the first and second sets of diffraction gratings with the beam-blocking shutter; and
   combining results from at least the first, second, and third exposures to produce a three-dimensionally periodic pattern in the photosensitive material.

2. The process of claim 1, further comprising revealing the three-dimensionally periodic pattern by a chemical development.

3. The process of claim 1, wherein the step of combining the results includes generating a first interference pattern using the first exposure, a second interference pattern using the second exposure, and a third interference pattern using the third exposure, wherein each interference pattern comprises a set of tilted parallel rods.

4. The process of claim 3, further comprising orienting said parallel rods and superimposing said oriented rods within a common volume of resist material to form a lattice structure.

5. The process of claim 4, wherein the lattice structure includes a lattice period and the titled parallel rods have a spacing therebetween, and the lattice period is controlled by modifying the spacing of the tilted parallel rods.

6. The process of claim 5, wherein the lattice period of the lattice structure is adjusted independently of a wavelength of the plurality of laser beams by varying orientations of the interfering beams.

7. The process of claim 1, wherein the steps of introducing the first plurality of laser beams, the second plurality of laser beams, and the third plurality of laser beams are performed sequentially; and each of said first, second, and third sets of diffraction gratings is oriented differently from both other respective sets.

8. The process of claim 7, wherein said beam-blocking shutter is moved by rotation.

9. The method of claim 1, wherein each of said first, second, and third pluralities of laser beams are generated from a single laser source.

10. The process of claim 1, wherein said grating array is a monolithic grating array.

11. A system for fabricating a three-dimensional photonic crystal, the system comprising:
    a laser source;
    a grating array comprising a plurality of sets of three differently oriented diffraction gratings located thereon;
    a mask plate having a back side located in contact with a photosensitive layer and a front side arranged in registration with the grating array; and
    a beam blocking shutter arranged between the grating array and the laser source, said beam blocking shutter configured to block a portion of the light directed through said grating array and moveable to at least three different positions, each position blocking a different portion of the grating array, the system configured to provide an exposure step with the shutter in each of the three different positions;

wherein each of the diffraction gratings is positioned and oriented so as to converge all first-order diffracted spots to a common point lying in a plane relative to the back side of the mask plate where said mask plate contacts said photosensitive layer.

12. The system of claim 11, wherein the system is configured such that there is no relative movement between the plurality of diffraction gratings, the mask plate, and the photosensitive layer.

13. The system of claim 11, wherein the beam blocking shutter includes a rotating shutter configured to sequentially allow light to pass through one of said sets of diffraction gratings while blocking the remaining sets of diffraction gratings.

14. The system of claim 11, wherein the laser source provides polarized light.

* * * * *